Figure 1:
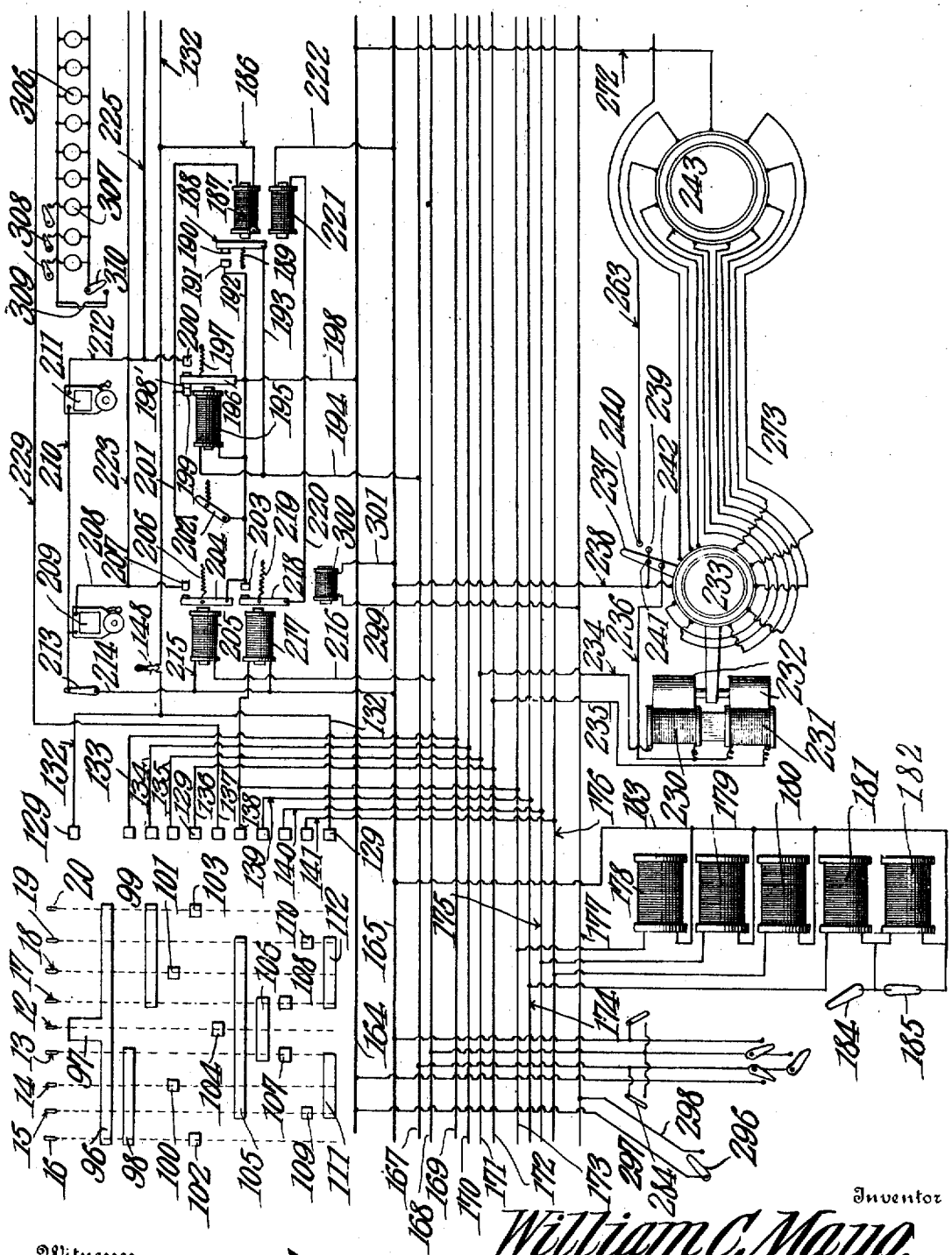

W. C. MAYO.
CONTROLLER FOR MOTOR TRACTION CARS.
APPLICATION FILED FEB. 24, 1908.

902,985.

Patented Nov. 3, 1908.
7 SHEETS—SHEET 1.

Witnesses

Inventor
William C. Mayo.
By
Attorneys

W. C. MAYO.
CONTROLLER FOR MOTOR TRACTION CARS.
APPLICATION FILED FEB. 24, 1908.

902,985.

Patented Nov. 3, 1908.
7 SHEETS—SHEET 2.

Witnesses
E. W. Stuart
F. T. Chapman

Inventor
William C. Mayo.
By C. A. Snow & Co
Attorneys

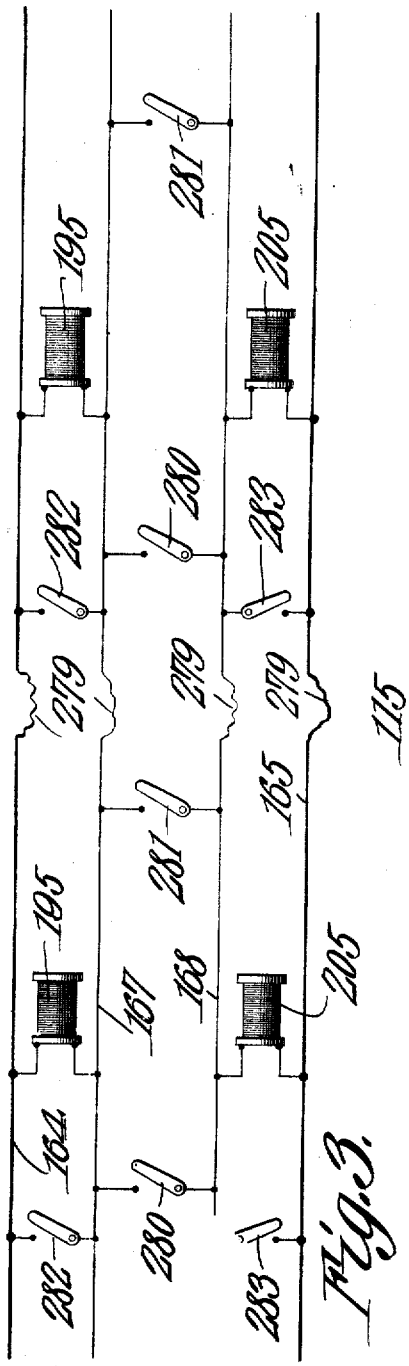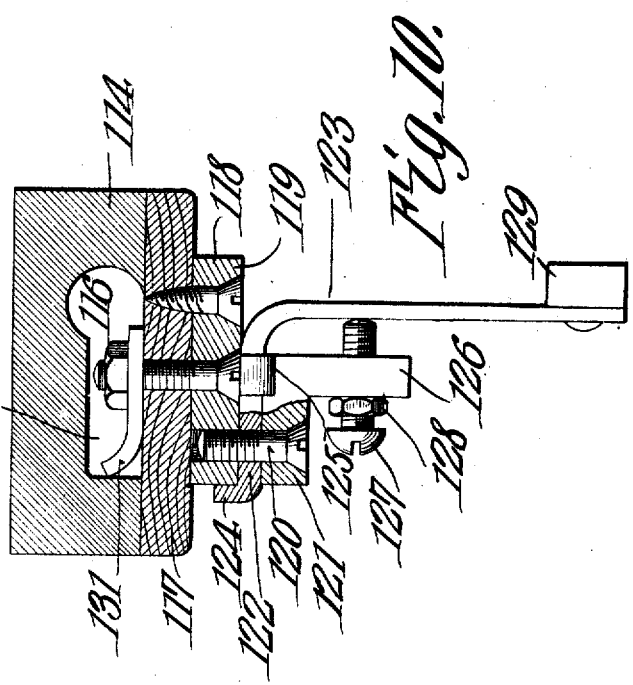

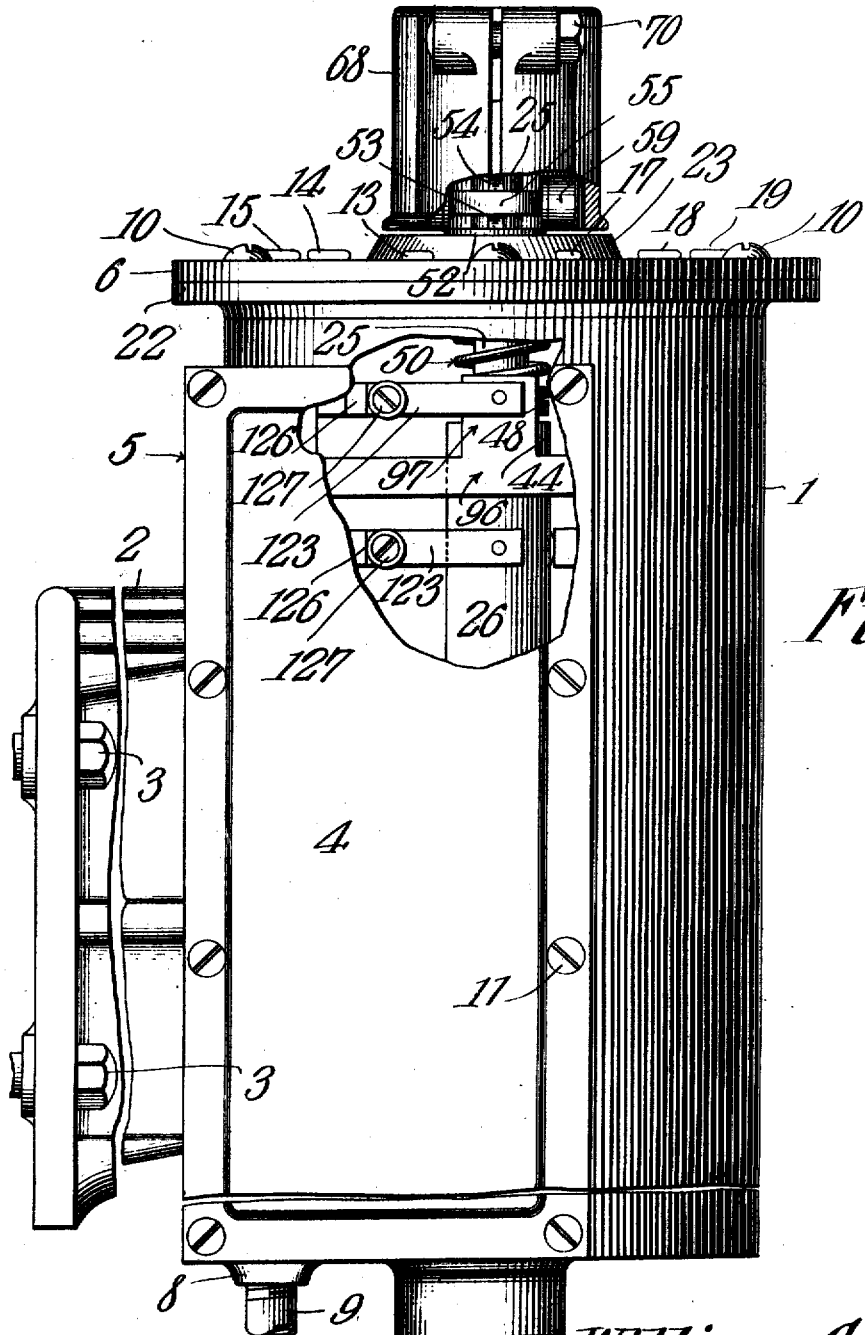

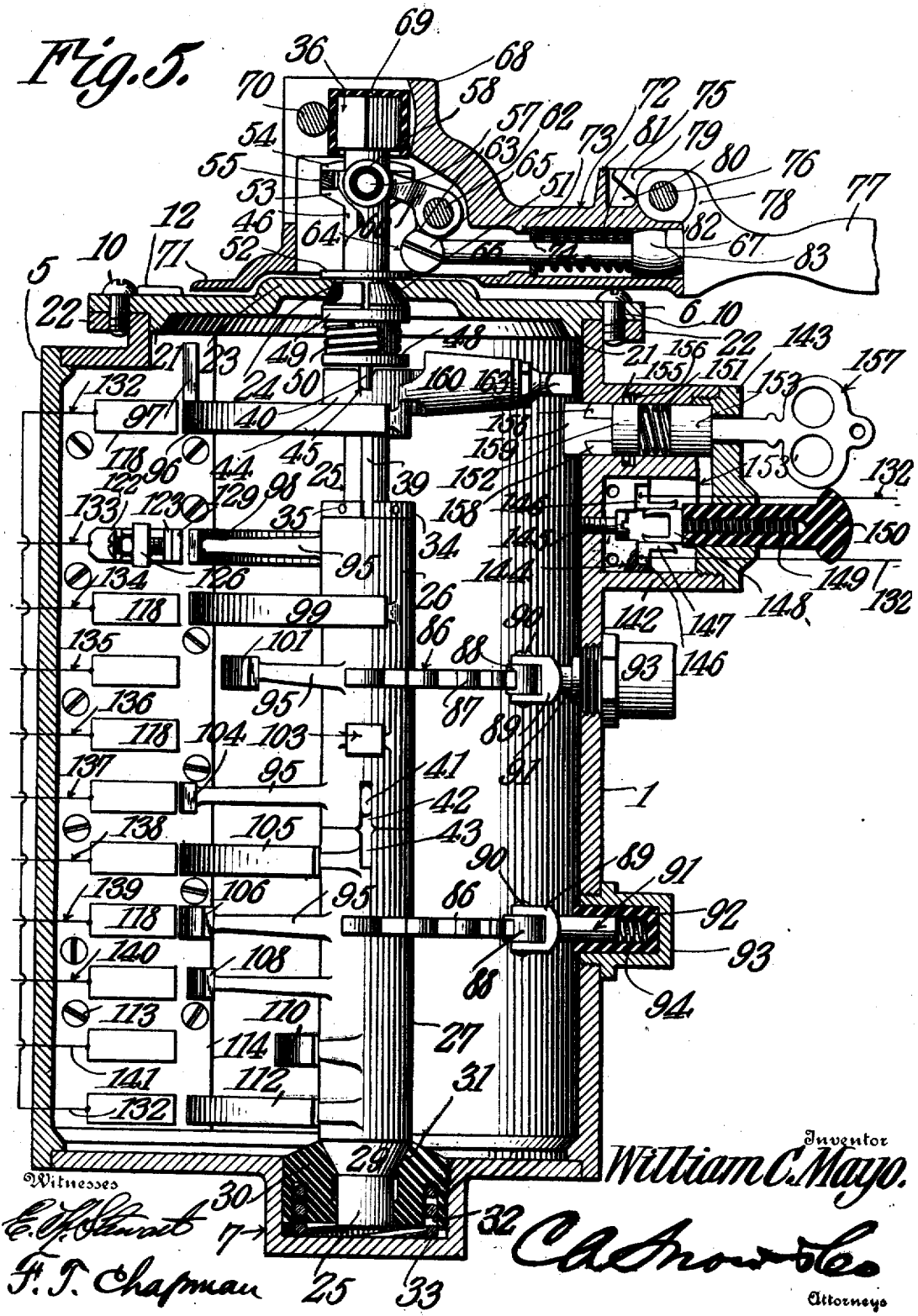

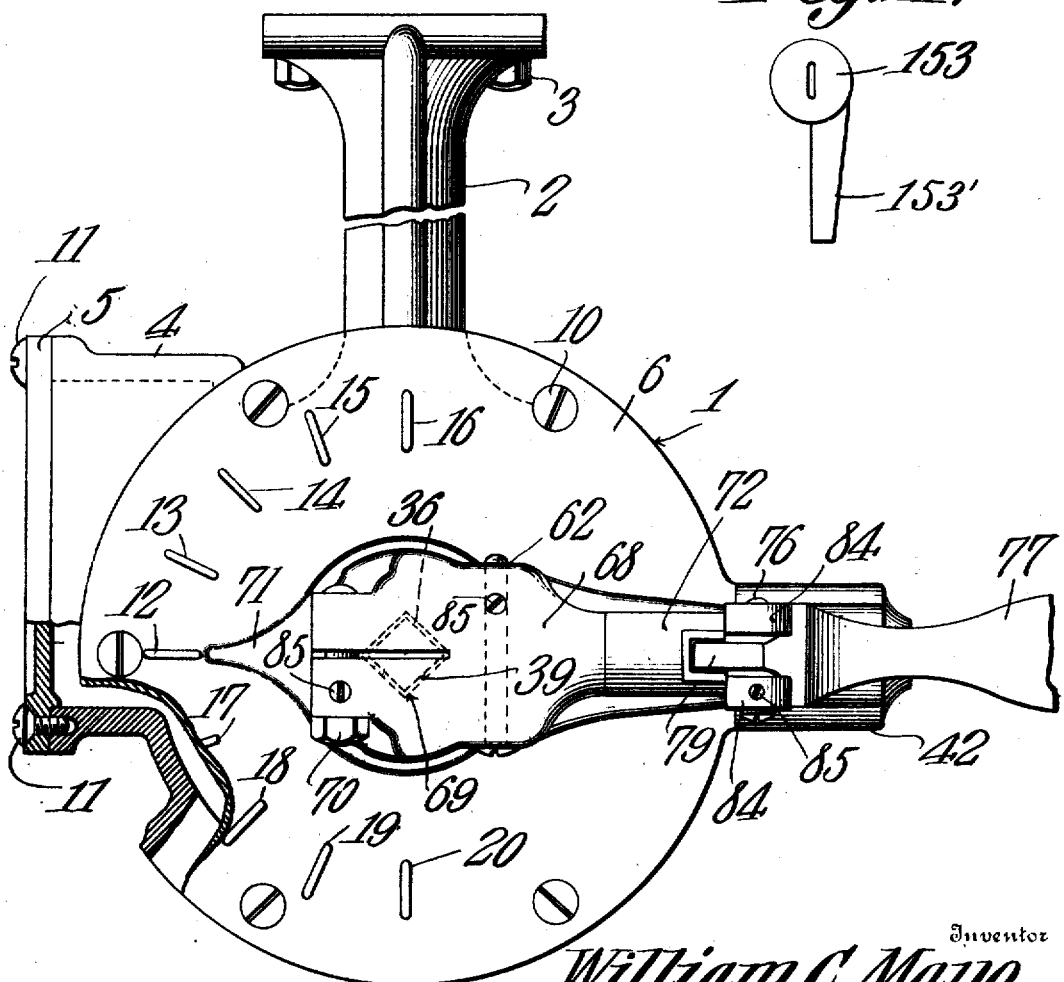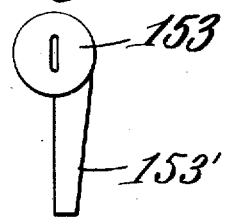

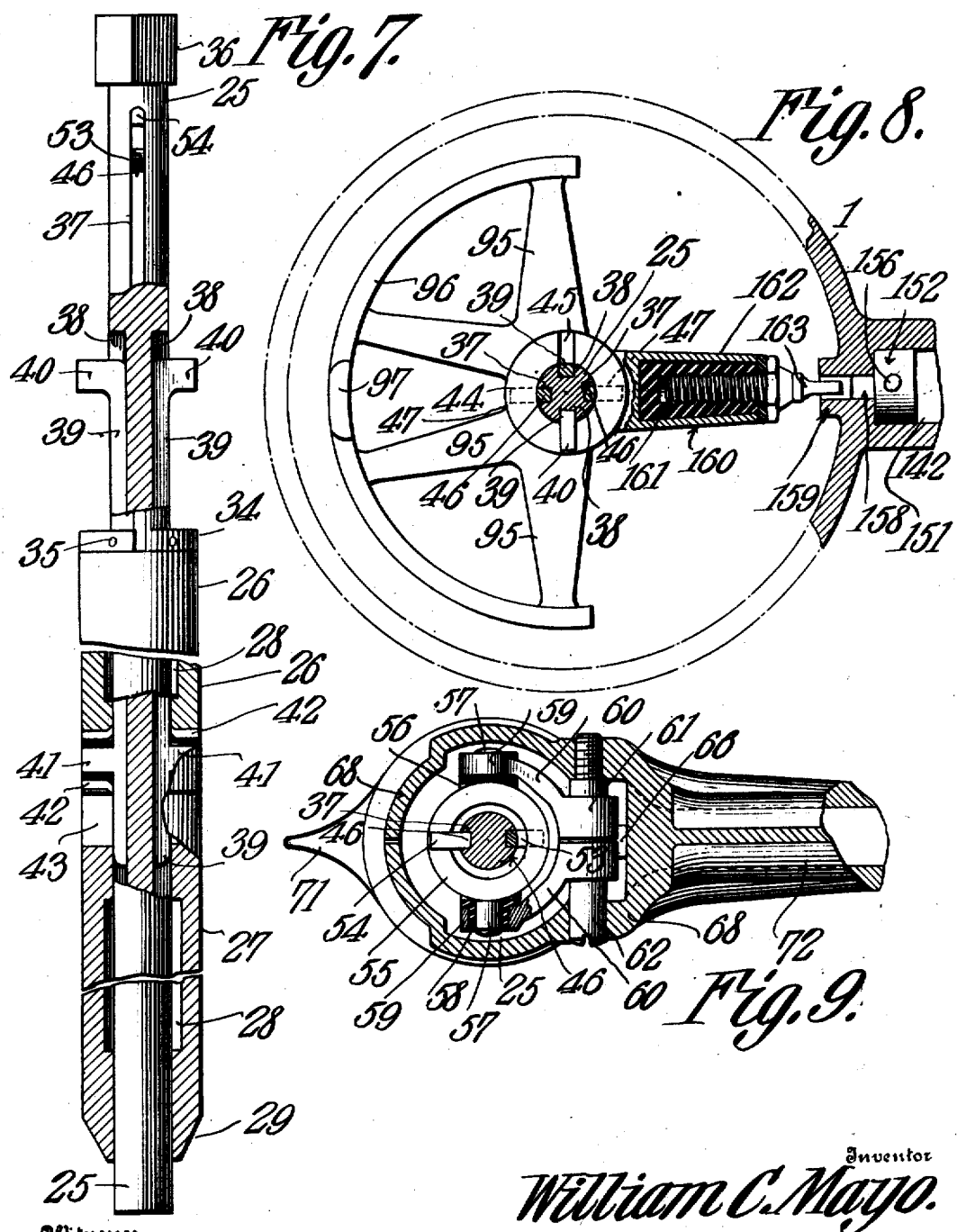

UNITED STATES PATENT OFFICE.

WILLIAM C. MAYO, OF EL PASO, TEXAS, ASSIGNOR, BY DIRECT AND MESNE ASSIGNMENTS, OF ONE-THIRD TO GEORGE E. BRIGGS, OF BARSTOW, TEXAS, AND ONE-THIRD TO JOHN HOULEHAN, OF EL PASO, TEXAS.

CONTROLLER FOR MOTOR TRACTION-CARS.

No. 902,985.   Specification of Letters Patent.   Patented Nov. 3, 1908.

Application filed February 24, 1908. Serial No. 417,431.

To all whom it may concern:

Be it known that I, WILLIAM C. MAYO, a citizen of the United States, residing at El Paso, in the county of El Paso and State of Texas, have invented a new and useful Controller for Motor Traction-Cars, of which the following is a specification.

This invention has reference to improvements in controllers for motor traction cars and in the system of which the controller forms a part.

In the system to which this invention relates each car, ignoring trailers, even when a number of such cars are coupled together to form a train, is provided with a prime mover. For reasons which need not be entered into here, such prime mover is preferably an explosive engine of the multi-cylinder type, and, since the cars so equipped will be used for city, suburban, and interstate traffic, and will be of heavy construction and designed to travel at high speed, say eighty or ninety, or more miles per hour, the engine will be of commensurate power and may be provided with as many as twelve power cylinders. This engine is maintained in constant operation and is connected up to an electric generator through a suitable regulating drive which maintains the voltage substantially constant. The regulator, in itself, forms the subject matter of another application and need not be particularly described herein. The generator is preferably a direct current dynamo and is utilized to supply current for all the purposes needed, as will hereinafter appear, and for this reason it must be maintained in constant operation, and, of course, the engine driving it is likewise maintained in constant operation.

To properly regulate the engine under the great variations of load incident to the operation of a car, there is provided an engine governor capable of taking care of these great variations in load without material variations in the speed of the engine. For the economical running of the engine, the governor is made to regulate the speed by cutting in and out engine cylinders without governing the charge of the individual cylinders, and the governor likewise controls certain other mechanisms which will be referred to later. Furthermore, the governor is inactive to a predetermined minimum number of engine cylinders except to prevent racing of the engine under exceptionally small loads. The structure of the governor, however, forms no part of the present invention and is made the subject matter of another application.

In order that the car may be started and stopped and also regulated as to speed, there is provided a transmission gear the particular structure of which is not a part of the present invention but forms the subject matter of still another application. Connected with the transmission gear is a positive clutch capable of connecting the gear up to the axles of the car in either the forward or reverse direction, and another clutch is provided, constructed to act both as a friction clutch and as a positive clutch under circumstances which will be referred to hereinafter, though the structure of each of these clutches forms in itself no part of the present invention. Furthermore, the cars are provided with electrically controlled air brake systems receiving current, when necessary, from the generator before referred to. Such an electrically operated air brake system does not in itself form a part of the present invention, but constitutes the subject matter of still another application and will be referred to only to the extent necessary for the understanding of the present invention.

Included in the general control system of the car are various signals, lights, and other devices which will be described in their proper place.

All the several mechanisms necessary for the proper running of the car are, to a large extent, automatic in their operations, except that they may be controlled by a motorman or engineman from one point of control in a certain prescribed way, and no other, the purpose being to constrain the engineman to follow the proper procedure under the penalty of having the car or train slow down, or even come to a full stop, when such is neither intended nor desirable.

The invention includes a controller by means of which the engineman may use his judgment in the running of the car provided the prescribed course of movements of the controller is strictly followed. This controller embraces means whereby the car may be started and brought up to any desired speed within the limits of the power, and maintained at such speed, and the speed, if less than the maximum, may be raised or lowered at the will of the engineman and the new speed may be maintained indefinitely. Furthermore, the car may be run in a reverse direction under the same facility of control by the proper manipulation of the same controller handle used to run it in the forward direction. Again, the car may be stopped by cutting off the power by returning the controller handle to a certain prescribed position, and then by further moving the handle in the same progressive direction the brakes may be applied in the same manner, generally considered, as the ordinary air brakes of steam railroads are manipulated.

The controller includes means for preventing overlapping of any of the operations or the variation of the proper sequence of operation, and provision is made for the locking of the controller against operation when so desired and for the bringing of the car to a standstill automatically should the engineman die at his post, or become too ill to manipulate the controller, or, in the case of danger, should leave his post.

The invention will be best understood from a consideration of the following detail description, taken in connection with the accompanying drawings forming part of this specification, in which drawings—

Figure 2:
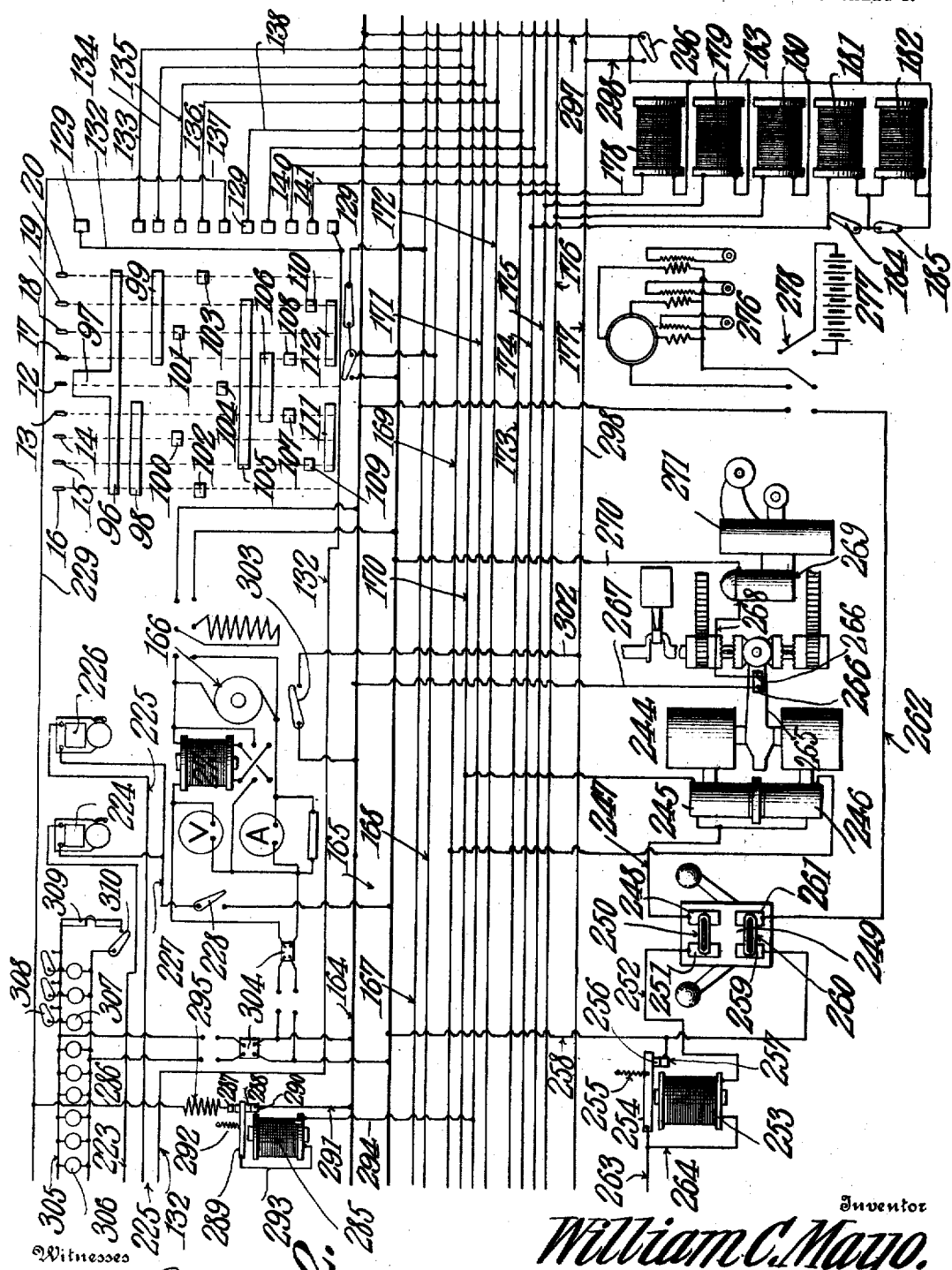

Figures 1 and 2 taken together illustrate diagrammatically the electrical connections of a single car, showing generally, the system of car control and also signal and lighting circuits. Fig. 3 is a diagram of a portion of the signal circuit extended through the train. Fig. 4 is an elevation, partly broken away and with some parts in section, of the controller. Fig. 5 is a central vertical section through the controller with parts shown in elevation. Fig. 6 is a plan view of the controller, with parts broken away and in section. Figs. 7 to 11 are detail views of the controller.

Before entering into a description of the system as a whole, the construction of the controller will be considered. This controller is shown in Figs. 4 to 11 and reference will now be had to these figures. There is a casing 1 generally cylindrical in shape having cast on one side a bracket 2 by means of which the casing 1 is secured to a suitable support by bolts 3. The continuity of the cylinder is broken by an offset 4 of general rectangular shape to contain certain of the mechanism, notably the "finger-board", and this receptacle is closed by a removable cover 5. The cylinder 1 has a top plate or cover 6, and at the other end is formed with an axial pocket 7. Below the finger-board receptacle, there is formed a boss 8 into which leads a pipe 9 for the introduction of a cable of electrical conductors to be hereinafter referred to.

The cover 6 is shown secured to the cylinder 1 by means of screws 10, while the finger-board receptacle 4 has its cover secured by screws 11, but, of course, the screws 11 may be replaced by other fastening devices commonly employed for this purpose. For instance, stud bolts and thumb nuts may be used, or thumb bolts and latches, or any other means not requiring the use of tools may be employed for fastening the cover 5, instead of using the screws 11. On top of the cover 6 and concentric with the center thereof is a semi-circular series of index projections, best shown in Fig. 6, where, for convenience, the central projection is numbered 12 with the projections on one side thereof numbered 13, 14, 15 and 16, respectively, and on the other side thereof these projections are numbered 17, 18, 19 and 20, this numbering being adopted for convenience in the description to follow.

The cover 6 is provided with an annular flange 21 which fits snugly into the top of the cylinder 1, while the edge of the cover rests upon a peripheral flange 22 formed on the top of the casing 1, through which flange the screws 10 pass. The center of the cover is slightly raised, as shown at 23 and has a tapered central perforation 24.

Extending throughout the length of the casing through the center thereof and through the passage 24 up above the top of the casing there is a shaft 25, shown in detail in Fig. 7. Upon this shaft are two sleeves or hubs 26 and 27 engaging the shaft at their ends only, the portions between the engaging ends being of larger internal diameter, as shown at 28. The sleeve 26 rests upon the sleeve or hub 27 and the latter has its lower end made frusto-conical, as shown at 29, and there engages a bushing 30 of suitable insulating material, which bushing has a conical seat 31 for the end 29 of the hub 27, and beyond the same is provided with a central cylindrical bore for the lower end of the shaft 25. The bushing 30 is of such size as to fit snugly into the pocket 7, and on its under side concentric with the bore for the shaft 25, this bushing is formed with an annular recess 32 for the reception of a spring 33, the lower end of which rests on the floor of the pocket 7. This spring tends to uplift the bushing 30 which, while fitting snugly in the pocket 7, is still free to move up and down therein. Above the hub or sleeve 26 there is fixed to the shaft a collar 34 by means of pins 35, or otherwise, so that the hubs or sleeves 26 and 27 cannot move upward on the shaft 25 because of the engagement of the hub 26 with the collar 34 and the engagement of the end 29 of the hub 27 with the bushing 30 upheld by the spring 33.

The upper end of the shaft 25 is formed with a square or polygonal head 36 and commencing a short distance below this head and extending lengthwise of the shaft are diametrically opposite keyways 37, and at a greater distance from the head 36 begin two other diametrically disposed keyways 38 reaching to the lower end of the shaft and arranged at right angles to the keyways 37. In the last named keyways 38 are longitudinally movable keys 39, one in each keyway 38. At the upper end each key 39 is formed with a laterally projecting finger 40 and at a point near the lower end each key 39 has a laterally projecting finger 41. The lower edge of the finger 40 and both upper and lower edges of the finger 41 are slightly rounded, as indicated. In the meeting faces of the hubs 26 and 27 are longitudinal recesses 42 and 43, respectively, that is, the recesses 42 are in the lower end of the hub 26, and the recesses 43 are in the upper end of the hub 27. These recesses are diametrically disposed in the respective hubs 26 and 27, and are of such width as to snugly but freely receive the fingers 41 on the respective keys 39. The fingers 41 are of less height than either recess 42 or 43, so that when in one recess it is free from engagement with the other recess. The meeting edges of the hubs 26 and 27 at the recesses 42 and 43 are slightly rounded, as indicated, so that the fingers 41 may pass from one recess to the other with freedom. As will hereinafter appear, the hubs 26 and 27 are capable of independent rotation about the shaft 25, thus bringing the recesses 42 and 43 into and out of coincidence, and it is only when these recesses are in coincidence that the keys 39 may be moved longitudinally to carry the fingers 41 from one recess to the other. The keys 39, with the exception of the fingers 40 and 41, have their outer edges flush with and curved to match the curvature of the shaft 25, so that either hub 26 or 27 may be rotated about the shaft without interference from the bodies of the keys.

Mounted on the shaft 25 between the fingers 40 and the collar 34 is another short hub 44 having in its upper face diametrically disposed recesses 45 adapted to receive the fingers 40. The upper edges of the walls of the recesses 45 are slightly rounded to facilitate the entrance of the fingers 40 into the recesses.

Seated in the keyways 37 are other keys 46 having fingers 47 on their lower ends engaging in appropriate recesses in the hub 44 at right angles to and on the opposite face from the recesses 45, that is, the fingers 47 engage in recesses on the under face of the hub 44.

Immediately above the hub 44, the shaft 25 carries a loose washer 48, and at a short distance above this washer the shaft has fast or formed thereon a collar 49 between which and the washer 48 there is confined a spring 50. On the upper face of the collar 49 is a frusto-conical bushing 51 seated in the tapered opening 24 in the cover 6. The bushing 51 is a split bushing made of suitable insulating material. This bushing 51, and the bushing 30 before referred to, form the two end bearings for the shaft 45.

For the purpose of the present invention, it is possible to use a low voltage electric current, say a current of about twenty-five volts, and, consequently, the insulation need not be of especially high resisting quality to the passage of the current. But, the insulation at these points must have good wearing qualities, since it forms the bearings for the shaft 25. It will be found, in practice, that vulcanized fiber answers the purpose and so may be advantageously used at these points. For this reason, I prefer to make the bushings 30 and 51 of vulcanized fiber. The bushing 51 being of conical shape tends to center this end of the shaft and, being a split bushing, will compensate for wear, while the bushing 30 centers the lower end of the shaft, and all wear is taken up by the spring 33. To prevent the entrance of dirt and dust, or other deleterious matters by way of the opening in the cover provided for the passage of the shaft, the latter is surrounded immediately above the cover by a soft rubber washer 52. The upper ends of the keys 46 above the cover are each formed into two spaced laterally projecting fingers 53 and 54, between which fingers engages a ring 55 surrounding, but of sufficient internal diameter to have considerable lateral movement without engaging the shaft 25. This ring is provided with diametrically opposite bosses 56 from which project trunnions 57 projecting in diametrically opposite directions. These trunnions are surrounded by flanged sleeves 58 of insulating material, and surrounding these sleeves are the heads 59 of two arms 60 terminating in knuckles 61 mounted on a pivot pin 62. Extending from each knuckle 61 is an angle arm 63 terminating in another knuckle 64 pivotally secured by means of a pivot screw pin 65 to one end of a rod 66, the other end of which terminates in a head 67.

The upper end of the shaft 25 above the cover of the casing, together with the parts connected therewith, as described, are all inclosed in a casing 68 resting on the upper end of the shaft but insulated therefrom by an insulating bushing 69. The portion of the casing 68 immediately embracing the square end 36 of the shaft 25 is split and united by a bolt 70, so that the casing may be firmly secured to the shaft at its square end and the shaft may be rotated with the casing. At one end of the casing at a point immediately above the cover 6 there is formed a pointing finger 71 reaching close to the index ridges 12 to 20. Diametrically opposite this finger the casing or head 68 is formed with a substantially cylindrical extension 72 in which is housed the rod 66 and its head 67. This extension 72 is formed with interior shoulders 73 against which abuts a washer 74 on the rod 66, and between this washer and the head 67 the rod is surrounded by a spring 75.

Pivoted to one side of the extension 72 by means of a suitable pivot pin 76 is a handle 77 having an offset 78 through which the pivot pin 76 extends, and beyond this offset there is formed a limiting lug 79 moving in a pocket 80 formed in an upward extension 81 on the extension 72. The handle 77 is also formed with a shoulder 82 so located as to engage a nose 83 on the head 67.

In Fig. 5, the handle 77 is shown in its lowermost position with the shoulder 82 in engagement with the nose 83 and with the end of the extension 72. In this position, the spring 75 is compressed, so that the rod 66 has been moved toward the shaft 25 and the angle levers 60 have been moved about the pin 62 to an extent sufficient to elevate the ring 55 to its uppermost position. When the handle 77 is released, the spring 75 will return the parts to their initial position, which means that the ring 55 is lowered and the handle 77 has its outer end elevated, being turned about the pivot 76 until the handle is at an angle of about twenty-two and a half degrees to the horizontal.

The pin 62 is mounted in the casing 68, one end of the pin being shouldered and screw threaded so as to be secured in said casing. The pin 65 is similarly constructed, except that it may be formed with a head to engage the knuckle 64, and the pin 76 is similar to the pin 62 and is seated in ears 84 formed on the upper face of the extension 72. Like screws 85 may be employed to hold the pivot pins 62 and 76 in place, and also the bolt 70, all as indicated in Fig. 6.

When the handle 77 is depressed, as shown in Fig. 5, then the keys 46 are elevated and the hub 44 is lifted against the action of the spring 50. This, of course, elevates the keys 39 so that the fingers 41 are in the slots 42 of the hub 26. Under these conditions if the handle 77 is so manipulated as to cause the casing 68 to rotate the shaft 25 upon a vertical axis, then the hubs 44 and 26, being keyed to the shaft 25 by the fingers 40 and 41, will participate in this rotative movement, but the hub 27 will remain stationary. If, now, the parts be assumed to be again in the position shown in Fig. 5, and the handle 77 be released, the spring 75 will elevate said handle and depress the keys 46, allowing the hub 40 to be forced downward by the spring 50, causing the keys 39 to participate in this downward movement until the fingers 41 are lodged in the recesses 43. Now, a rotative horizontal movement of the casing 68 will cause the hubs 44 and 27 to move rotatively with the shaft 25, while the hub 26 remains stationary. For convenience of description, the handle 77 will hereinafter be referred to as the handhold, while the handle 77 and casing 68 as a whole will be referred to as the controller lever.

Formed on each hub 26 and 27 is an arc 86 having in its periphery a number of notches 87 of suitable shape and in the path of the notched periphery at each arc is a roller 88 mounted in a fork 89 by means of a journal screw 90, and the fork 89 is formed on one end of the rod 91 movable longitudinally in an insulating bushing 92 housed in a cup 93 screwed into a threaded perforation formed in the wall of the casing 1 at an appropriate point. Within the bushing 92 there is confined a spring 94 urging the rod 91 outward. The roller 88 thus constitutes an elastic stop for the arc 86, and the notches 87 are so located as to coincide with the alinement of the finger 71 of the controller lever when opposite the index ridges 12 to 20. The controller lever is thereby yieldingly stopped opposite each index ridge. The bushings 92 may be made of any suitable insulating material, but to prevent the loosening of the insulation because of shrinkage, the bushings 92 may in this instance be made of lavite pressed into the cup and bored or ground true, or, since approximate precision of fit will be sufficient under the conditions present, the lavite bushing may be simply molded in place without being ground.

Projecting from the hub 44 are arms 95 carrying a semi-circular contact segment 96 having at its central portion an upward projection 97. Upon the hubs 26 and 27 are like arms 95. The arms on the hub 26 carry other contact segments 98 to 104, inclusive, while the arms on the hub 27 carry contact segments 105 to 112, inclusive. The lengths and locations of these several segments 96 to 112 and their purposes will be referred to later.

Within the offset 4 at the deeper end thereof there is secured, by means of screws 113, a strip 114 of insulating material extending the length of the offset. This strip has a longitudinal channel 115 with a circular enlargement 116 at one side in line with the pipe 9 before referred to and designed to receive the cable of conductors leading into the controller. The strip 114 has a cover 117 on which are secured a number of metal blocks 118 each by means of screws 119. In the particular structure under consideration, there are shown eleven blocks 118 one for each contact segment or horizontal series of contact segments, as the case may be, upon the hubs 45, 26 and 27, respectively. Secured to each block 118 by a screw 120 is a clamp block 121 between which and the block 118 is secured one end 122 of a spring plate 123 having its free end at right angles to the end 122 and connected thereto by an easy curve, as shown. The clamp end of the spring 123 projects slightly beyond the blocks 118 and 121 and is there bent over against the block 118 as shown at 124. On each side of the clamped end 122 of the spring 123 there are formed lugs 125 which are bent up against the sides of the block 121 to prevent side movement of the spring and thus permitting the use of but one clamp screw 120. Formed on the block 121 is a post 126 which carries a set screw 127 engaging the spring 123. By means of this set screw, the position of the spring may be accurately determined and wear may be compensated for, and the set screw is locked in position by a clamp nut 128 upon the screw. Each spring 123 carries at its free end a contact block 129 which may be of the same size as the smallest segment carried by the hubs 26 and 27, and the working faces of these blocks, as well as the working faces of the several contact segments carried by the hubs may have their edges slightly rounded to prevent these parts from catching one on the other when brought together.

Each block 118 is connected by a bolt 130 to a clip 131 housed in the channel 115 and receiving the terminal of one of the conductors of the cable mentioned, the clip and conductor end being connected by solder or otherwise. In Fig. 5, only one of the contact brushes and its mounting is shown complete, and in place of the other contact brushes the blocks 118 only are shown, it being understood, however, that each block 118 will carry a complete contact brush.

The uppermost and lowermost blocks 118 are connected to a conductor 132 which, for the purposes of the following description, will be considered as the common return conductor for the controller to the source of electric energy. The other blocks are connected to conductors 133 to 141, respectively, and the purposes of these various conductors will be described farther on.

Formed on one side of the casing 1 is a receptacle 142 provided with a cover 143. In the bottom of this receptacle is an insulating block 144 secured in place by a screw 145 and carrying two spaced metallic blocks 146 terminating in opposed, separated, contact springs 147. The blocks 146 are interposed in either the outgoing or return conductors of the source of electric energy. In Fig. 5, these blocks are shown as included in the conductor 132. To bridge the springs 147, and so complete the circuit at this point, there is provided a spring plug 148 on one end of a threaded rod 149 entering an insulating handle 150, and this plug is introduceable through a suitable perforation in the cap 143 in the receptacle 142. The body of the handle 150 may be flattened, or be otherwise shaped, and the perforation in the cover 143 may be of similar shape, so that the bridging block 148 may always register with the springs 147. The showing of this plug and coöperating parts is largely conventional, and it is to be understood that any other suitable type of plug may be used.

The container 142 is formed adjacent to the terminal holding part with a compartment 151 which houses a lock member 152 and a key block 153 between which there is a helical spring 154. The lock member 152 is provided with latch bolts 155 capable of being projected into recesses 156 in the adjacent walls of the receptacle 142. The lock member 152 is only conventionally shown and may be of any suitable type whereby a key 157 when introduced through the block 153 and into the lock member 152 may be made to operate the lock member to withdraw the bolts 155 from the sockets 156. On the inner face of the lock member 152 are two spaced lugs 158, and flanking these lugs are two spaced wings 159 formed on the inner face of the casing 1. The lugs 158 are curved on their ends from the outer toward the inner faces, as indicated.

Cast on the hub 44 on the side away from the arms 95 is another arm 160 with a hollow tapering bore filled with insulating material 161 and receiving the threaded end 162 of a finger 163 flattened on the sides and in line with the space between the wings 159. This finger projects sufficiently from the hub 44 to be engaged by the wings 159 when between the same. The bore of the arm 160 being slightly tapering and the insulating material 161 being made of lavite, or some other non-shrinkable, insulating material, forms a strong insulating connection between the finger 163 and the hub 44.

In the position shown in Fig. 5, the finger 163 is above the wings 159 and, consequently, the hub 44 may be turned about a vertical axis. As has been before explained, the hub 44 is keyed to the shaft 25, and the two must therefore turn together, and either the hub 26 or the hub 27 will participate in this movement according to whether the hub 44 is in the uppermost or the lowermost position, in which case the controlling fingers 41 are in the slots 42 or 43 of the respective hubs 26 or 27. In the transitional stage when the hub 44 is being lowered from the position shown in Fig. 5, the finger 163 passes between the wings 159, consequently, the shaft 25 cannot be rotated until the finger 163 has passed beyond the lower edges of the wings 159. By the time this has occurred, the fingers 41 are safely housed in the slots 43 of the hub 27, and it is only when this transitional movement is fully accomplished that the controller lever may again be moved about a vertical axis. The finger 163 and the wings 159 therefore coact as a transitional lock, while the controller lever is being moved out of operative relation with one of the hubs 26 or 27 into operative relation with the other of the hubs 26 or 27. It is, therefore, impossible to overlap the operations set up by the hubs 26 and 27.

Formed on the key block 153 is an arm 153' projecting laterally from this block and movable across the inner face of the cover 143 to a position closing the opening through which the bridging plug is inserted. When neither key nor plug are in place, the lock member 152 has the bolts 155 withdrawn and the spring 154 moves the lock member toward the interior of the casing 1 until the lugs 158 are in the path of the finger 163. Now, when this finger is lowered, which occurs when the lever 77 is released to the action of the spring 75, the finger 163 engaging the sloping or curved edges of the upper lug 158, push the lock member against the action of the spring 154 until the finger 163 is coincident with the space between these lugs 158, when the spring 154 is free to act and the lugs 158 are pushed into the path of the finger 163 with one lug above and the other lug below it, thus effectually locking the hub 44, and consequently the handle 77, from movement in a vertical plane, and the controller lever and parts controlled thereby from movement in a horizontal plane. Now, the relation of the lock member 152 and lock 153, through which latter there may be a narrow key slot adapted to the particular type of key used, is such that the key can only be inserted into the lock member when the arm 153' is in a position to close the passage through which the bridging plug is inserted.

The lock member is so constructed that the bolts 155 can only be withdrawn from the slots 156 when the key is in this same position. Now, when the key is inserted, it will engage the lock member 152, and then by a turn of the key, the latter becomes fixed in the lock member, so that the key and lock member may be pulled outward, moving the lock member out of the path of the finger 163, when the latch bolts 155 will snap into the recesses 156, the spring 154 having in the meantime been compressed. Since it was necessary to turn the key 157 to withdraw the lugs 158 out of the path of the finger 163, the arm 153' was likewise moved out of coincidence with the passage for the bridging plug, which latter may now be inserted and the circuit ,completed between the springs 147. Under these conditions, the key 157 cannot be withdrawn from the lock, and it is only when the plug is withdrawn and the circuit broken that the key may be turned so as to be withdrawn from the lock when the bolts 155 are likewise moved out of the recesses 156 and the lock member is impelled by the spring 154 again into the path of the finger 163. Nor can the plug be again inserted until the key is once more placed in the lock as before described. The interior construction of the lock member 152 has not been shown, since there are known lock structures which will answer the purpose and any particular lock structure is not included within the scope of the present invention.

The general scheme of the electric circuit throughout the car is shown in Figs. 1 and 2, the two figures being taken together. Each car has extending therethrough from end to end a bundle of conductors preferably in the form of a cable with terminals at each end of the car, so that the several cables of the cars of a train may be coupled together to form a continuous cable extending throughout the length of the train. The cable comprises the mains 164 and 165 coming from the dynamo 166. In addition to these mains there are two signal conductors 167 and 168. The cable likewise includes two conductors 169 and 170 for the reversing clutch, and two other conductors 171 and 172 for the transmission gear. In the cable there are also included four brake controlling conductors 173, 174, 175 and 176, and finally there is another conductor 177 for the whistle. The cable thus includes the supply mains for the current and other through conductors which may be termed the train wires or conductors.

Each power car, and likewise each trailer where such are used, is supplied with an air brake system such as is shown and described in my application No. 403,361, filed Nov. 22, 1907. This air brake system is complete in each car and includes both the means for establishing air pressure and an electrically operated triple valve whereby the several braking operations may be effected. While, as set forth in the aforesaid application, the electric triple valve may be used in conjunction with the ordinary air brake systems, and also the ordinary single brake cylinder and brake rigging may be used, still, it is preferable to use a separate brake cylinder and triple valve for each car truck, and in the diagram, Figs. 1 and 2, this is considered to be the case.

Since the present invention has to do only with the electrical control of the brakes, the electrical side only of the triple valve is shown in the diagram. In this triple valve, there is a controlling solenoid 178 for the emergency part of the triple valve, another solenoid 179 for slow release, another solenoid 180 for the service application of brakes, another solenoid 181 for the ordinary release of the valves, and still another solenoid 182 for releasing the valves under the action of straight air, since the triple valve is adapted for either automatic air or straight air. One side of each solenoid is connected by a branch conductor 183 to the dynamo main 165. The emergency solenoid 178 is connected to the conductor 173, the solenoid 179 is connected to the conductor 175, the solenoid 180 is connected to the conductor 176, and the solenoids 181 and 182 are connected to the conductor 174 through the shunt switches 184 and 185, so that the solenoid 181 may either be connected up between the conductor 174 and the conductor 165, as are the other solenoids, or the solenoid 182 may be so connected up with the solenoid 181 cut out.

Reverting to the controller brushes, it will be observed that conductor 132 connecting the two end brushes 129 in multiple is common to these brushes in both controllers. A branch conductor 186 leads from the conductor 132 to a magnet 187 controlling an armature 188 in opposition to a spring 189, and this armature is provided with a contact 190 in the path of which is another contact 191 forming the terminal of a conductor 192. The armature 188 is connected by a branch conductor 193 to another branch conductor 194 leading to the conductor 167. The conductor 194 at its other end is connected to a magnet 195 which, in turn, is coupled to the conductor 192. The magnet 195 controls an armature 196 in opposition to a spring 197 and this armature is connected by a conductor 198 to the dynamo main 164. The free end of the armature 196 carries a through contact 198' in the path of which are oppositely disposed contacts 199 and 200. The contact 199 is connected to a conductor 201 leading from the magnet 187 and ultimately connected to the conductor 192 through a switch 202. The conductor 192 leads to a terminal 203 and also to an armature 204 controlled by a magnet 205 in opposition to a spring 206, and in the path of the armature 204 when moved by the spring 206 is a contact 207 at one end of a conductor 208 leading to one side of an electric bell 209, the other side of which is connected to a conductor 210 one end of which latter is, in turn, connected to one side of an electric bell 211, the other side of which is connected by a conductor 212 to the contact 200 before mentioned. The conductor 210 is connected to a switch 213 which, in turn, is connected by a conductor 214 to the dynamo main 165, and branched off from this conductor 214 is another conductor 215 leading to one side of the magnet 205, the other side of which is connected by a conductor 216 to the signal wire or conductor 168. Also connected to the conductor 214 is a magnet 217, the other side of which is coupled to the conductor 138. Under the influence of the magnet 217 there is an armature 218 controlled, in opposition to the magnet, by a spring 219 by which the armature is drawn into contact with the terminal 203 when the magnet is deënergized. The armature 218 is connected by a conductor 220 to another magnet 221 which, in turn, is coupled by a conductor 222 to the dynamo main 165. Branched off from the conductor 208 is another conductor 223 leading to one side of a bell 224 at the end of the car remote from the bell 209, and branched off from the conductor 212 is another conductor 225 leading to one side of a bell 226 adjacent to the bell 224. The other sides of the two bells 224 and 226 are connected in multiple to a conductor 227 leading to the dynamo main 165 and including a switch 228.

The conductor 133 of the controller is connected to the clutch conductor 169, and the controller conductor 134 is connected to the clutch conductor 170. The controller conductor 135 is connected to the transmission gear conductor 171, and the controller conductor 136 is connected to the transmission gear conductor 172. The controller conductor 137 is connected by a conductor 229 to the corresponding conductor of the controller at the other end of the car. The controller conductor 138 is connected to one side of the magnet 217, as before stated, and is also connected to the brake triple conductor 173 coupled to the solenoid 178. The controller conductor 139 is connected to the conductor 174, which is also connected to the solenoids 181 or 182, as the case may be. The controller conductor 140 is connected to the brake triple conductor 175 which, in turn, is connected to the solenoid 179, and the controller conductor 141 is connected to the brake triple valve conductor 176 which, in turn, is connected to the solenoid 180.

In an application No. 385,645, filed by myself and John Houlehan on July 26, 1907, for speed changing gear, or, as I have heretofore called it, transmission gear, there is set forth a structure whereby the speed of transmission between the prime mover and the car wheels will automatically increase or decrease as long as certain circuits are maintained, and which will cease, to either increase or decrease, under certain other conditions. In this speed changing or transmission gear there are two solenoids 230, 231 controlling an air impelled mechanism 232 arranged to put a rotary switch 233 into and out of action and to cause it to move in either direction. The solenoid 230 is connected by a conductor 234 with the conductor 171, and the solenoid 231 is connected by a conductor 235 with the conductor 172. The other sides of each solenoid 230 and 231 are connected together to a conductor 236 leading to an arm 237 carried by the switch 233, but normally not moving therewith.

Current is supplied to the switch 233 through a conductor 238 coming from the dynamo main 165, and this conductor 238 is branched to a contact 239 adjacent to which is another contact 240. There is also in the branch leading to the contact 239 another contact 241 adjacent to a contact 242 to which the conductor 236 leads, and these two contacts 241 and 242 are normally bridged by the arm 237. Now, as has been explained, in the aforesaid application, No. 385,645, this arm 237 is movable for a very limited distance at the end of the travel of the switch arm in either direction to break the circuit between the contacts 241 and 242, and thus deënergize the solenoids 230 and 231 automatically.

The switch 233 is coupled up to the speed changing gear which is only conventionally shown at 243, so that as the switch is moved around over its several contacts, the transmission of speed from the prime mover to the car axles is progressively increased or decreased, as the case may be, and this increase and decrease is progressive and automatic at all times.

In connection with the transmission or speed changing gear, there is a reversing clutch 244 conventionally shown in Fig. 2. This clutch is also shown in detail and fully described in the aforesaid application, No. 385,645. It is only necessary to state herein that this clutch is designed to couple up the transmission or speed gear to the car axles to cause them to turn in either direction. This clutch is controlled by two solenoids 245, 246, the solenoid 245 being connected to the conductor 170 and the solenoid 246 being connected to the conductor 169. The other sides of the solenoids 245 and 246 are connected in common to a conductor 247 leading to a terminal 248 under the control of a governor 249 for the prime mover which, in the system under consideration, is assumed to be an explosive engine of the multi-cylinder type. This governor is shown in detail and fully described in application No. 377,169, filed by myself and John Houlehan, on June 4, 1907, for improvements in governors for explosive engines. Since this governor forms no part of the present invention, in so far as its detailed construction is concerned, it is only conventionally shown in the drawings, and its operation will be referred to only in so far as may be necessary. The governor controls a bridging conductor 250 in operative relation to the terminal 248 and another terminal 251, which latter is connected by a conductor 252 to one side of a magnet or solenoid 253. This magnet 253 has an armature 254 provided with a spring 255 acting against the pull of the magnet, and this armature also carries a contact 256 in the path of which is another contact 257 connected by a conductor 258 to the dynamo lead or main 165. The conductor 258 is also connected to a terminal 259 under the control of a bridging conductor 260 carried by the governor, and coupling this terminal 259 normally to another terminal 261 coupled to a conductor 262. The purpose of this last conductor 262 will appear later.

The armature 254 is connected by a conductor 263 to the terminal 240, before referred to, and the other side of the magnet 253 from that connected to the conductor 252 is connected by a branch conductor 264 to the conductor 263.

The clutch mechanism 244 carries a bridging conductor 265 arranged to close the circuit between the two circuit terminals 266, one of which is connected by a conductor 267 to the dynamo main 164, and the other of which is connected by a conductor 268 to a solenoid 269 which, in turn, is connected by a conductor 270 to the dynamo main 165. The solenoid 269 controls a clutch uncoupling mechanism 271 also fully shown and described in the aforesaid application No. 385,645. It may be here stated in relation to the structure conventionally illustrated at 271, that the clutch controlled thereby is interposed between the prime mover and the transmission or speed changing gear and is of a type operating frictionally up to a certain predetermined speed and then coupling the parts positively.

Now, let it be assumed that the engine and dynamo are running, but that the car is standing still and the controllers are both locked with the plugs 148 removed. The key 157 is inserted in the lock, as shown at Fig. 5, and the lock member 152 is pulled away from engagement with the finger 163, and the key is turned to cause the bolts 155 to engage in the recesses 156. This turning of the key moves the arm 164 away from the opening to which the plug is inserted, and the latter may then be caused to close the circuit at the terminals 147. With the controller lever in the central position, there is established a circuit between the dynamo main 165 and the dynamo main 164 by way of the conductor 183, emergency solenoid 178, release solenoid 181, conductors 138 and 139 to the contact segments 105 and 106, thence through the controller shaft to the segment 96, and by way of this segment to the conductor 132, thence through the conductor 186, magnet 187, conductor 201, armature 196, to the other main 164, the magnet 195, which constitutes the emergency signal relay magnet, being normally charged. With the parts in the position described the engine and dynamo are running and the brakes are in the full release position, but the car is standing still or its axles are uncoupled from the driving power. Let it now be supposed that the motorman desires to apply the power to drive the car in a forward direction. To do this, he grasps the handhold 77 and presses down upon the same thus compressing the spring 75 and lifting the hub 44 against the action of the spring 50 through the keys 46 and at the same time coupling the hub 26 to the controller-shaft. Under these conditions if the controller lever be moved laterally then the several contact segments carried by the hub 26 and also the contact segment 96 will participate in this movement.

Since the contact 96 is equal in length to the full sweep of the controller lever or handle, the circuit between this segment and the conductors 132 is always maintained. The motorman moves the controller lever until the pointer is opposite the index ridge 17. Under these conditions the segment 98 is brought into engagement with the contact terminal of the conductor 133 and so the circuit is completed through this conductor to the train conductor 169, thence to the solenoid 246 of the clutch mechanism and by the conductor 247 to the governor bridging conductor 250 and conductor 252 to the solenoid 253, thence by way of conductor 264 to the conductor 263 and to the contact 240. This last-named contact and the contact 239 is, under the conditions assumed, now bridged by the arm 237 so that the circuits are completed by the conductor 238 back to the dynamo main 165. The solenoid or magnet 253 is thus energized and the armature 254 is drawn toward it so that another circuit through the contacts 256, 257 and conductor 258 is completed to the dynamo main 165 and the solenoid or magnet 253 is thus maintained energized after the circuit between the contacts 239 and 240 is broken. The solenoid 246 moves the clutch into a position to couple up the speed changing gear for forward movement of the car. But the speed-changing gear is not yet in mesh. This mechanism, which is fully set forth in the aforesaid application #385,645, is so arranged that the speed may be progressively raised or lowered by throwing into mesh different sets of gear teeth with pinions coupled to the clutch. Now, the motorman moves the controller handle or lever until the indicator is at position 20. There is then established a circuit by way of the contact segment 102 to the conductor 136, thence to the conductor 172, and by way of conductor 235 to the solenoid 231, thence by conductor 236 to the arm 237, and by way of the contact 239 with which this arm is now supposed to be connected by way of the conductor 238 to the dynamo main 165.

The solenoid 231 couples up the switch 233 of the transmission gear to a moving part actuated by the engine in such manner that this switch is caused to make progressive contact with the series of conductors leading to the speed-changing gear 243 so as to progressively project and retract series of gear teeth at suitable time intervals to cause the speed of the car to be increased progressively so long as the electrical contacts just described are maintained except that as soon as the switch 233 begins its movement then the arm 237 has a slight movement sufficient to disconnect it with the contacts 239 and 240 and complete the circuit through other contacts 241 and 242. The circuit through the mechanism of the transmission or speed-changing gear indicated at 243 is from one dynamo main 164 through a conductor 272 to the speed-changing or transmission gear 243, thence by one after the other of the conductors 273 connecting the switch and speed-changing gear electro-mechanical parts and back to the dynamo main 165 through the conductor 238. So long as the controller lever is in the position where its pointer is opposite the index 20 then the speed constantly picks up until ultimately the maximum speed may be reached, which in practice may be eighty or ninety miles per hour or a higher speed, as may be desired. When this speed is reached there is provision for the breaking of the circuit between the contacts 241 and 242 so that the solenoid 231 will be deënergized and further progressive movement of the switch is stopped automatically. This is all set forth in the aforesaid application #385,645.

Suppose that the motorman desires to run his speed below the maximum, then when such speed is attained he moves the controller lever or handle to the position 19, thus breaking the circuit through the solenoid 231 and stopping the movement of the switch 233 so that the speed-changing gear remains in the position then attained and the car will run indefinitely at that speed, or at the speed commensurate with the power supplied at that position of the transmission gear.

Let it be assumed now that after having caused the car to run at some desired speed the motorman desires to lower the speed, then he moves the controller lever or handle to the position 18, thus bringing the contact segment 100 into contact with the conductor 135, which is connected to the train conductor 171, and this in turn is connected by the conductor 234 to the solenoid 230 and the circuit is completed through the conductor 236, contacts 241 and 242 and conductor 238 back to the dynamo main 165, as before. Now, the switch 233 is coupled up in the reverse direction and the speed-changing gear is progressively actuated to lower the speed until the desired lower speed is attained, when by moving the controller-arm or lever back to position 19 this lower speed may be continued.

Suppose now that the motorman wishes to stop the car, as for instance on the approach to a regular stop or station, then he moves the controller lever to the position 18 until the speed-changing gear has reached its lowest point. Then he moves the controller lever by the position 17 to the position 12, which will disconnect the clutch and leave the train moving under its own momentum.

In order to stop the car on the approach to a station or under other circumstances, the controller lever, after being brought to the central position, is relieved from the pressure of the hand of the motorman so that the hand-hold is lifted by the action of the spring 75 and the hub 27 is coupled thereto, as has already been described. Now, the controller is in position for applying the brakes. For this purpose assuming that the application of brakes is to be an ordinary service application, then the controller lever is moved to position 15. Under these conditions the emergency solenoid 178 still is energized through the contact 105 and conductor 138, and the service solenoid 180 is energized through the segment 110 and conductor 141 to the train conductor 176 to which this solenoid is connected, the return being through the common return conductor 183. The controller lever is held in its position for a sufficient time to produce the service reduction of pressure desired, whether the same be light or heavy, and when this is accomplished then the controller lever is moved to position 14 which is the position of lap.

When it is desired to again release the brakes the controller lever is brought back to the central position, or if it be desired to slowly release the brakes, then the controller is brought to position 13, thus bringing the contact segment 108 into connection with the conductor 140 which in turn is connected to the train conductor 175, and the latter is connected to the solenoid 179 by means of which the slow release of the brakes is effected, as fully set forth in my aforesaid application 403,361.

It is to be observed that the movement of the controller lever from the position of full speed to the brake positions is in one progressive direction so that the motorman has not to change the direction of movement when he desires to slow down and stop. Also, it will be observed that the various positions already described are duplicated so that for running in a reverse direction the motorman has but to proceed with the controller in the manner already described but in the direction opposite to that assumed. When this is done the clutch solenoid 245 is energized instead of the solenoid 246, but the several other operations are the same as before. The solenoid 245 is energized through segment 99 and its connections.

When the motorman desires to apply the emergency brakes he may slow down as before and by moving the controller to position 16 the emergency solenoid is cut out of the circuit and the brakes are applied in the manner fully set forth in the aforesaid application #403,361, since in the triple forming in part the subject-matter of the said application the emergency application of the brakes is due to the deënergization of the emergency solenoid. Should it be further presumed that the car is running and that for any reason the motorman should release the pressure on the controller lever hand-hold, whether from illness or death or fright, then the segment 96 will be lowered out of contact with the brush 129 connected to the conductor 132 and the circuits through the car-controlling mechanisms are all broken with the prime mover disconnected from the car axles and the emergency solenoid deënergized so that there is at once an emergency application of the brakes, and the car is automatically brought to a standstill in the least possible space of time. This emergency application of the brakes is in the complete system of which this present application for patent forms a part, supplemented by an automatically-operating track brake tending to materially shorten the time necessary for the stopping of the car when the brakes are applied under emergency conditions. When the controller hand-hold is released in central position, then the circuit is maintained through the projection 97 of the segment 96, since the automatic application of the brakes due to the disability or neglect of the motorman is effective only when the car is running.

Should the motorman become careless or attempt to "jockey" with his controller then provision is made whereby the circuit is automatically broken by the governor mechanism, as fully set forth in application #377,169, before referred to, the construction being such that a motorman must bring the speed gear to the lowest point before he can again couple up the car to the prime mover, and this is also true in the case of an emergency application of the brakes while the car is coupled up for running. Should an emergency condition arise when the car is going at some speed, either full speed or some less speed but still coupled up to the prime mover, then the motorman has but to release the hand-hold 77 and the full emergency application will be brought about automatically so that whether the motorman sticks to his post or whether he becomes panic stricken and jumps, the emergency application of the brakes will be made in either instance.

It is to be noted that the air brake mechanism is provided for each end of the car. This avoids the use of train pipes, except where used in connection with the usual brake systems, and is supplemented by the use of air brake cylinders in each truck, thus avoiding the use of brake rigging.

The controller mechanism is of course duplicated at each end of the car. By carrying the train conductors through all the cars of the train and having these cars provided with the several mechanisms described, a single controller on the head car may be made to control all the cars simultaneously. The invention contemplates the use of a prime mover upon each car, with a current generator on each car and the speed-controlling mechanism as well as the brake mechanism, so that each car is a unit in itself but may have its electrical connections coupled up to the controller of the head car so that all these several mechanisms work in unison under the control of one motorman.

Each dynamo 166 on each car is provided with a suitable regulator 275 and is driven by a suitable prime mover which is not shown in the drawings but may comprise a multi-cylinder explosive engine governed as set forth in the aforesaid application #377,169, and the regulator for the dynamo may be of the type set forth in an application of myself and John Houlehan for regulator for electric machines, #381,072, filed June 27, 1907. It is not deemed necessary to describe the generator circuits in detail since they are fully described in the application for Letters-Patent for the regulator, but it may be stated that these circuits are so arranged that the dynamos of the several cars may be connected up for action in unison and the current will be maintained at a substantially constant voltage by the regulators.

As set forth in the application #377,169, the governor is arranged to cut out the sparking circuits of a certain number of the engine cylinders when the speed for any reason exceeds a certain predetermined limit. These sparking circuits are indicated generally at 276, while a battery 277 may be used for the purpose of initially starting the engine through a suitable switch 278 so that after the engine has been started the battery may be switched out and the dynamo circuit switched in to maintain the engines in operation and to save the battery.

Before proceeding with the description of the signal and lighting circuits, it will be observed that the contact segments 111 and 112 serve to maintain the circuit through the conductor 132 on the brake side of the controller as soon as the extension 97 of the segment 96 has been moved out of contact with the corresponding bush 129 so that the main circuit is not broken in the brake positions except in the emergency position. When the brake side of the controller is in the central position then these contact segments 111 or 112 no longer make contact with the particular brush 129 in their path, so that the circuit through the conductor 132 may be broken at the contact segment 96, when the latter is in the car control position should the pressure of the motorman's hand upon the hand-hold 77 be released.

In Fig. 3, is shown a diagram of the signal circuits, and this figure may be taken in connection with Figs. 1 and 2. There are shown the two dynamo leads 164 and 165 and two signal conductors 167 and 168. There is also shown the emergency signal relay 195 and the regular signal relay 205. In the diagram, Fig. 3, two cars so equipped are shown, and the conductor couplings 279 are conventionally indicated. It will be understood that any number of cars may be used.

Each car is provided with an end switch 280 at one end and another end switch 281 at the other end to couple the corresponding ends of the signal wires 167 and 168. The end switch 281 in the rear end of the last car is always closed in the regular running of the train. Under these conditions the emergency signal relay 195 is coupled on one side to the dynamo lead 164 and on the other side to the signal wire 167 while the regular signal relay is coupled on one side to the dynamo lead 165 and on the other side to the signal wire 168 with the circuit between the signal wires closed by the switch 281. The several relays are, therefore, in multiple series and with each wound to the same ohmic resistance, which should be high to render the line resistance of the train wires 167 and 168 negligible, then for any given voltage the current values in each relay, and hence the magnetic values, are the same and are exactly one-half of what they would be were the relays connected in multiple to a line of similar voltage. Of course the emergency relays are in multiple-arc with the dynamo lead 164 and signal wire 167 and the regular relays are in multiple arc with the other dynamo lead 165 and signal wire 168, and these two combinations are placed in series by the end switch 281 on the last car. It is of course evident that the end switch on any car may be closed for the same purpose but in a train the end switch of the last car and only that switch must be closed so that should a train break in two, then the circuits through all the relays will be open. Each car is also provided with two shunt signal switches 282 and 283. These shunt switches are secured to suitable cords running through the train and in order to avoid confusion these cords may be differently colored or otherwise characterized so that by pulling one cord the shunt switch for the emergency signal relay may be operated by the conductor, or by pulling the other cord the shunt switch for the regular relay may be pulled by the conductor. To further differentiate these cords they may be located on opposite sides of the car.

By means of the signal circuit described the conductor may readily signal the motorman or engine man, and near the motorman is a small switch, say the switch 284, within easy reach so that the motorman need not let go the controller handle as might be necessary in order to reach the cord. The conductor or engine man or motorman, are in constant signaling relation no matter in what part of the train the conductor may be. The train circuits also enable the conductor to stop the train independent of the motorman should such become necessary, and the electrical connections are such that should the train break in two, power will be shut off from the motor car and the brakes will be applied while the broken rear end of the train will also be brought to a standstill automatically.

The system of control herein set forth differs from the usual air brake control of steam driven trains, in that should a break in the train occur power is shut off and the brakes simultaneously applied so that severe or disastrous strains are avoided.

It is to be observed that the various solenoids and the magnets, and whenever magnets are indicated they may be replaced by solenoids, are coupled up in multiple-arc with the exception of the series controller solenoid 187. For reasons which need not be entered into here I prefer to employ a constant potential dynamo of the direct current type for the energization of the various electromechanical structures included in the system. For this reason the solenoids or magnets are coupled up in multiple-arc and series arrangements are avoided wherever possible. However, the series magnet or solenoid 187 must be so constructed as to operate as needed under great variations in current. The current value will depend on the position of the controller since there are different solenoids included in the circuit at different positions. Each one of these variations is multiplied by each additional car and if in each car there are five variations due to the five controller positions, then on twenty cars there will be one hundred variations and on a hundred cars five hundred variations. Since with one car the signal wires and solenoids are unnecessary, though they should be present with a view to using the car in a train, therefore, the minimum number of cars to be considered may be taken as two and the maximum may be any number within reason. The area of wire of the solenoid must therefore be such as to safely carry the maximum current without undue resistance. Since the magnetism is nearly proportional to the ampere turn and also with shallow windings the length the turns are nearly equal, then it may be assumed that with such windings the magnetism is directly proportional to the ampere turns and the magnetic pull being given the ampere turns may be readily calculated, while the given ampere turns divided by the maximum controller current necessary for the two cars will give the actual turns of winding. The resistance of the winding may be calculated, and this added to the train line resistance, both of which may be made negligible for two cars, will give the external resistance in circuit with the operating solenoids of the train and in order that undue magnetic variations may not occur in the train line solenoids from current variations due to their external resistance on cars being added to form a long train, then the resistance of the solenoids should be relatively high. On determining the ratio between the resistance of the series solenoid and the resistance of the external line and assuming a given voltage, say twenty-five volts, the magnetic pull for the solenoid can be re-calculated. When the values for the train solenoids and the series solenoid have been finally determined comparisons can then be made and changes be effected until the proper values for the respective devices have been determined. Under these conditions even when the series solenoid is energized by the weakest current, still it is able to perform the functions desired, and since it is calculated to work magnetically at or near the saturation point, increased ampere turns due to increased current will have practically no effect since the slightly greater magnetism, if kept within bounds and the armature is prevented from contact with solenoid core to avoid sticking, will be ineffective. To avoid any detrimental effects from the heavy winding and small amount of iron present in the magnetic circuit, tending to produce residual magnetism, then a reversing switch may be added which may be thrown at intervals to cure such tendency.

Since direct current is used in this system the area of the winding of solenoid 187 is sufficient to carry the maximum current without considerable voltage drop, and considering the relatively high resistance of the train solenoids, it will be seen that the latter are not disturbed to an appreciable extent by current variations in the series solenoid, and while these current changes may cause considerable current difference in the winding of the series solenoid 187 they will produce much less effect magnetically because of the small magnetic core. The solenoids are all small since little air is needed for the opening and closing of the various air valves, and consequently the energy passing through the controller will never be large, although considering the small potential, say twenty-five volts, the current may be fairly large. Should, under some conditions, it be found that such a low voltage necessitates too heavy a controller construction and involves too much copper, then higher pressure may be used, but low pressures have the advantage of durability and reliability in service because there is less danger of short circuits or wire troubles, and the insulation problems are simple, windings are cheap, and so on. For higher pressures the current-carrying parts may be smaller and hence cause less tendency of heating at switches and other contacts. Of course each individual case will present its own problems and usually the voltage required will in most cases not fall below twenty-five nor rise above fifty volts.

The circuit-breaking relay 253 used with the engine governor has only certain solenoids local to each car to deal with and hence the current in it does not vary, and though it is a series solenoid it presents no particular difficulty and need not be further considered. This is also true of the circuit-breaking relay 285 shown in Fig. 2 in connection with the transmission or speed-changing-gear controlling segment 104. The two segments 104 of the two controllers of the car are connected together by the conductor 229, as already explained. Tapped off from this conductor is a jumper conductor 286 leading to a contact 287 in the path of a contact 288 carried by the armature 289 of the relay magnet or solenoid 285. In the path of the contact 288 is another contact 290 connected by a conductor 291 to the dynamo lead 164. The armature 289 is under the control of a spring 292 in opposition to the pull of the magnet, and this armature is connected by a conductor 293 to one side of the coil of the magnet or solenoid 285, the other side of which is connected by a conductor 294 to the train wire 171, which in turn is connected to the solenoid 230 of the transmission or speed changing gear switch 233. The spring 292 tends to maintain the armature 289 with the contact 288 against the contact 287. This connects the segments 104 of both trollers to the speed-down side of the switch 233 of the speed-changing gear. As has already been stated, should the motorman or engineer shut off power while at high speed, the rotary switch 233 will remain in the high speed position and after a quick stop it is not desirable to place the rotary switch on the slow speed by means of the controller, this controller position being used merely to reduce speed under normal conditions. Now, should the motorman stop the car with the transmission or speed-changing gear set for high speed, the corresponding load will cause the governor to cut the engine out. When the motorman places the controller on the central or off position, the current passes through the relay 285, and this connects the low speed side of the rotary switch 233 to the same side of the circuit that the contact 100 or 101 would connect it. Under these conditions the magnet or solenoid 285 remain in series with the rotary switch-controlling solenoid 230, and ultimately the rotary switch is moved to lowest speed, after which the arm 237 automatically opens this circuit, all as set forth in detail in the aforesaid application #385,645. The rotary switch 233 is so arranged that when the clutch circuit is closed the speed-changing gear is still on the first or lowest speed position with the low speed circuit open and the car may run on such speed indefinitely. If the motorman places his controller in position to cause the switch 233 to move toward the speed-raising position, then just previous to its going to the second speed the rotary switch will close the lowering speed circuit. The solenoid or magnet 285 may not receive enough current to operate all of the lowering speed solenoids on a long train. This is of no consequence since just previous to the breaking of the circuit between the terminals 287 and 288 the circuit is completed from the dynamo lead 164 through the terminal 290. To prevent short circuiting on account of the low resistance of solenoid 285, the resistance 295 is included in the conductor 286.

No matter at what speed the car or train may be traveling the controller, if placed at off position, will, through the solenoid 285, cause the rotary switch 233 to be rotated in a direction to bring it to the lowest speed position, which position is suitable for the starting of the car, and the limited movement of the arm 237 then momentarily breaks the circuit, thus deënergizing the solenoid 285, this break occurring only when the low speed position has been reached. It is to be especially noted that the closing of the contact terminals 288 and 290 is effected just previous to the opening of the contact between the terminals 287 and 288, so that the continuity of the circuit is preserved, since otherwise the spring 292 would produce a vibrating of the armature 289 and thus prevent the proper operation of the solenoid 285. When the branch 291 has been included in the circuit, then sufficient current will flow for energizing the solenoid 230. To prevent undue heating, resistance, etc., the winding of the solenoid 285 must be such as to carry the maximum current for the number of solenoids 230 which will be included in the circuit when the maximum number of cars are included in the train. What has been stated with respect to the winding of solenoid 187 will apply to the winding of the solenoid 285.

In practice, the solenoid 285 with the attendant parts, may be used in the ballistic form, which may be attended by a small glycerin dash-pot or any other suitable damping device. Since such devices are commercially available, it is not deemed necessary to illustrate them. The disadvantages of a series solenoid as hereinbefore outlined will hardly apply to the solenoid 285, since the work demanded of it is normal and lasts but for an instant. When the controller actuates the solenoid 285 the current passing through it into the solenoid 230 under each car will in most cases be too small to actuate the several solenoids 230, but as before stated, when the branch 291 is included, then the current is sufficient.

Now, since the contact segment 105 is in circuit with the conductor 138 except in the emergency position of the brakes, then the solenoid or magnet 217, which is in circuit with this conductor, is constantly energized. When, however, the controller is put in the emergency position this magnet 217 is deënergized and another circuit is established through the magnet or solenoid 221 which, through a suitable mechanism not shown, is made to operate suitable sand valves so that sand could be deposited upon the track when the emergency brakes are applied. Of course these sand valve magnets 221 may be operated directly by the controller, but with long trains this would mean an unnecessarily heavy controller segment and a useless consumption of current. With one or two car trains the relays need not be used at all but are advisable in long trains and are to be used upon any car which is intended to be used in long trains. Of course for city street cars relays and many other parts of the equipment designed more particularly for long trains for suburban or interstate traffic can be dispensed with but when the cars are used for freight or passenger traffic the relays and other parts are needed.

In the case of trailers when used, and there is no hose connection between the cars, then such trailers are provided with air-pump and brake equipments and such other parts as may be necessary, but in the case of trailers the engine and dynamo are omitted. The air pump in such case if present on the trailer is operative from the car axles through suitable machinery.

Located within easy reach of the motorman is a switch 296 connected on one side by a conductor 297 to the dynamo lead 164, and on the other side to a train conductor 298 which in turn is connected by another conductor 299 to a solenoid 300 constructed to operate an air whistle or a whistle receiving the exhaust impulses of the engine. This solenoid 300 is connected by a conductor 301 to the other dynamo main 165. The switches 296 with their connections are located at each end of the car, while the conductor 298 may be connected at an intermediate point by another conductor 302 to the dynamo main 164 through a suitable switch 303, and this switch 303 is located within easy reach of the conductor or trainman other than the motorman. Should the motorman desire to warn persons of the approach of the train by means of the whistle he has but to close the switch 296. Should the train break in two then the signals may be exchanged between the motorman on the front of the train and trainmen on the broken away portion of the train at the rear by means of whistle signals.

The dynamo circuits are provided with suitable fuse blocks 304, and such switches as may be necessary, and leads to lamp circuits 305 in which may be included a suitable number of incandescent lamps 306 for the lighting of the car, and when needed may be carried to a trailer unsupplied with a source of current. The lamp circuits include pilot lamps 307 under the control of switches 308 and if needed an arc lamp 309 of a train head light under the control of a switch 310. These pilot lights and arc lights are duplicated on the two ends of each car.

While the controller hereinbefore described is designed for and is particularly applicable for use in the system comprised in this invention, still it has features which renders its use advantageous for other systems and is readily adapted to other systems by a suitable change in the connections, the controller still retaining the unique design and automatic features constituting valuable parts of the controller.

What is claimed is:—

1. A system of control for motor traction cars, comprising electrically actuated, mechanical devices for controlling the application of power to the car axles, electrically controlled brake operating devices, and a controller having a median position of inactivity, the said controller being provided on one side of the median position with contacts for closing the electric circuits of the devices for controlling the application of power to the car axles and on the other side of said median position with contacts for closing the electric circuits of the brake operating devices.

2. A system of control for motor traction cars, comprising electrically actuated, mechanical devices for controlling the application of power to the car axles, electrically controlled brake operating devices, and a controller having a median position of inactivity, the said controller being provided at one side of the median position with contacts for closing the electric circuits of the devices for controlling the application of power to the car axles, and on the other side of said median position with contacts for closing the electric circuits of the brake operating devices, and also having its movable circuit closing parts moving in the same sense from the full speed or any intermediate position to the full brake or any intermediate position, or the reverse.

3. A controller having circuit terminals for train-operating devices and other circuit terminals for brake-operating devices, and a controller lever or handle movable in a vertical plane and also upon a vertical axis, said controller handle being coupled to circuit-closing means for the train-controlling circuits when in one phase of its vertical adjustment and being coupled to the circuit-closing means for the brake-controlling circuits when in another phase of its vertical adjustment.

4. A controller having a predetermined range of movement on each side of a median position for coupling up electric circuits to cause the operation of electrically-controlled apparatus in forward and in reverse directions, respectively, said controller also having two positions of vertical adjustment, one controlling the train-driving mechanism and the other controlling the brake-operating mechanisms.

5. A controller having two sets of independently movable circuit-closing means, one set for electric circuits controlling car driving mechanisms and the other controlling brake-operating mechanisms, and a controller handle or lever yieldable under pressure and provided with means when so moved under pressure to couple the car circuit controlling means to the controller lever or handle and movable when relieved from pressure to couple the brake-operating circuit terminals to the controller lever or handle.

6. A controller having two series of contact segments, a rotatable member for each series of contact segments, a rotatable support for the rotatable members, a controller lever or handle carried by the rotatable support and having a part movable in a vertical plane to two positions, and means connected to said vertically movable part for coupling the rotatable support to either of the rotatable contact carriers for the independent operation of the latter in accordance with the position of the vertically-movable part of the lever or handle.

7. A controller provided with circuit terminals for electric circuits controlling car-operating devices, other circuit terminals controlling circuits for brake-operating devices, and means for effecting the emergency application of brakes when the controller lever is released from the control of the operator while in position to control the circuits of the car-actuating devices.

8. In a controller, a rotatable shaft, two hubs mounted and rotatable independently with said shaft, contact segments carried by each hub, circuit terminals in the paths of said contact segments, a key movable longitudinally in the shaft and having a part movable therewith into engagement with either of the hubs to lock the respective hubs to the shaft, and means for causing the movement of the key into engagement with either of the hubs and for rotating the shaft together with the locked hub to carry the contact segments into engagement with the circuit terminals.

9. In a controller, a rotatable shaft having longitudinal keyways, hubs mounted on said shaft exterior to the keyways and provided with longitudinal slots at their meeting edges, contact segments carried by each hub, circuit terminals in the paths of the contact segments, keys seated in the keyways in the shaft and each having an extension projecting into one or the other of the slots in the meeting faces of the hubs, and means for moving the keys longitudinally of the shaft to couple one or the other of the hubs to the shaft by the projecting portion of the keyway.

10. A controller provided with two series of contact segments each series being movable independent of the other series, a third contact segment movable with either series, circuit terminals in the paths of the contact segments, and means for coupling either series of segments to the controller handle or lever for the operation thereof by said handle or lever together with the third-mentioned contact segment.

11. A controller provided with a shaft rotatable about a vertical axis, two contiguous hubs mounted on said shaft and each provided at the meeting faces with longitudinal slots or recesses matching when the hubs are in a predetermined relation one to the other, a series of contact segments carried by each hub, another hub movable longitudinally with relation to the shaft and also rotatable therewith, a contact segment carried by the last-named hub, circuit terminals in the paths of all of the contact segments, keys movable longitudinally with relation to the shaft, said keys being in constant engagement with the hub carrying the signal contact segment and movable into engagement with either of the hubs carrying the series of contact segments through the slots in the meeting edges of said hub, other keys carried by the shaft and in constant engagement with the hub carrying the single contact segment and movable longitudinally with relation to the shaft, and means for moving the last-named keys longitudinally of the shaft and so effecting the longitudinal movement of the hub with the single segment and the keys carried thereby longitudinally of the shaft.

12. A controller having a rotatable shaft, contiguous hubs mounted thereon, and each carrying a series of contact segments, said hubs being loosely mounted on said shaft, means for coupling either of the two hubs to the shaft for rotation therewith, another hub carrying a single contact segment, said hub being movable longitudinally on said shaft and permanently coupled thereto for rotation therewith, means for rotating the shaft, and means for preventing the two contiguous hubs from being coupled simultaneously to the shaft for rotation therewith.

13. A controller having a rotatable shaft, contiguous hubs mounted thereon, and each carrying a series of contact segments, said hubs being loosely mounted on said shaft, means for coupling either of the two hubs to the shaft for rotation therewith, another hub carrying a single contact segment, said hub being movable longitudinally on said shaft and permanently coupled thereto for rotation therewith, means for rotating the shaft, means for preventing the two contiguous hubs from being coupled simultaneously to the shaft for rotation therewith comprising a projecting member on the hub carrying the single contact segment, and fixed parts in the path of said projecting member except at the extreme limits of its movement longitudinally of the shaft.

14. In a controller, a rotatable shaft, contiguous hubs each carrying a series of contact segments, another hub in constant rotative engagement with the shaft and movable longitudinally with relation thereto, means for effecting the longitudinal movement of the last-named hub, means under the control of the last-named hub for coupling one or the other of the contiguous hubs to the shaft for rotation therewith, and means carried by the longitudinally-movable hub coacting with the fixed structures for preventing rotative movement of the said hub while being moved longitudinally to couple the respective contiguous hubs to the shaft.

15. In a controller, a rotatable shaft having keyways therein, two contiguous hubs each having a series of contact segments thereon and provided with longitudinal slots at their meeting edges matching at a predetermined position of said hubs, another hub provided with longitudinal slots and movable longitudinally with relation to the hub, keys seated in the longitudinal recesses of the shaft and extending from the longitudinally-movable hub in both directions, each key having a projecting portion engaging a respective slot in the longitudinal hub and one or more of the keys having a projecting portion engaging a respective slot at the meeting faces of the contiguous hubs, and other of the keys having projecting portions remote from the contiguous hubs, a spring tending to move the longitudinally-movable hub in one direction, a clip member engaging the projecting heads of the keys remote from the contiguous hubs, and a spring controlled lever for moving the clip engaging the keys and carried by the controller lever or handle.

16. In a controller, a rotatable shaft having keyways therein, two contiguous hubs each having a series of contact segments thereon and provided with longitudinal slots at their meeting edges matching at a predetermined position of said hubs, another hub provided with longitudinal slots and movable longitudinally with relation to the hub, keys seated in the longitudinal recesses of the shaft and extending from the longitudinally-movable hub in both directions, each key having a projecting portion engaging a respective slot in the longitudinal hub and one or more of the keys having a projecting portion engaging a respective slot at the meeting faces of the contiguous hubs, and other of the keys having projecting portions remote from the contiguous hubs, a spring tending to move the longitudinally-movable hub in one direction, a clip member engaging the projecting heads of the keys remote from the contiguous hubs, an angle lever engaging the clip, a head or casing carried by the shaft and constituting the controller handle or lever and also carrying the angle lever, a spring-controlled rod connected to the angle lever, and a pivoted hand hold carried by the controller lever casing and engaging the spring-controlled rod to move the same against the action of the spring.

17. In a controller, a rotatable shaft having keyways therein, two contiguous hubs each having a series of contact segments thereon and provided with longitudinal slots at their meeting edges matching at a predetermined position of said hubs, another hub provided with longitudinal slots and movable longitudinally with relation to the hub, keys seated in the longitudinal recesses of the shaft and extending from the longitudinally-movable hub in both directions, each key having a projecting portion engaging a respective slot in the longitudinal hub and one or more of the keys having a projecting portion engaging a respective slot at the meeting faces of the contiguous hubs, and other of the keys having projecting portions remote from the contiguous hubs, a spring tending to move the longitudinally-movable hub in one direction, a clip member engaging the projecting heads of the keys remote from the contiguous hubs, an angle lever engaging the clip, a head or casing carried by the shaft and constituting the controller handle or lever and also carrying the angle lever, a spring-controlled rod connected to the angle lever, a pivoted hand-hold carried by the controller lever casing and engaging the spring-controlled rod to move the same against the action of the spring, and elastic stop members for yieldingly holding the rotatable shaft in predetermined positions of rotation.

18. In a controller, a rotatable shaft, an elastic insulating step support for the same at its lower end, an insulating journal support adjacent to the upper end of the shaft, and a controller lever or handle carried by the upper end of the shaft and insulated therefrom.

19. In a controller, a vertical shaft for carrying contact segments, an insulated step bearing for the same, a spring tending to elevate said bearing and thereby elevate the shaft, and an insulating split ring constituting the upper bearing for the shaft.

20. In a controller, a vertical rotatable shaft, terminating at the upper end in a non-circular head, contact segments carried thereby, a step bearing for the shaft comprising a suitable block of insulating material, a spring upholding said block and tending to elevate the shaft, a split ring of insulating material constituting the upper journal bearing for the shaft, said ring being conical-shaped, a conical seat for the ring, a controller lever or handle engaging the non-circular upper end of the shaft, and a bushing of insulating material interposed between said upper end of the shaft and the lever or handle.

21. A controller provided with a rotatable shaft, a series of contact segments mounted on said shaft and rotatable therewith one series independent of the other, means movable into engagement with one or the other of the mountings of the series of contact segments to couple either of said mountings to the shaft for rotation therewith, and means for preventing rotative movement of the shaft while the coupling means are being moved into engagement with the respective mountings for the series of contact segments.

22. A controller provided with a rotatable shaft, a series of contiguous segments mounted on said shaft and rotatable therewith one series independent of the other, means movable into engagement with one or the other of the mountings of the series of contact segments to couple either of said mountings to the shaft for rotation therewith, means for preventing rotative movement of the shaft while the coupling means are being moved into engagement with the respective mountings for the series of contact segments, said means comprising an insulated finger carried by and movable longitudinally with relation to the shaft, and parallel fixed members between which the finger may move in the longitudinal plane of the shaft, said parallel fixed members being of such length as to be interposed in the path of said finger except at the limits of its movement longitudinally of the shaft.

23. In a controller, a shaft, circuit-controlling means carried thereby, a member movable longitudinally of said shaft, and a key-controlled lock member for engaging the longitudinally-movable member and holding it against movement in any direction and thereby holding the shaft against rotation.

24. In a controller, circuit controlling means, a lock, means actuated thereby for holding the movable parts of the controller against action, circuit terminals in said controller, a removable bridging plug for said circuit terminals, and means carried by the lock and co-acting with the plug for preventing the introduction of the latter to bridge the circuit terminals when the lock is active to hold the movable parts of the controller against action, and for preventing the operation of the lock when the plug is in place.

25. In a controller, circuit controlling means, a lock for holding the movable parts of the controller against action, a bridging plug for opening and closing the electrical circuit of the controller, said plug and lock co-acting to prevent the introduction of the plug when the lock is in its active position, and to prevent the operation of the lock when the plug is in its active position.

26. In a controller, circuit-controlling means housed in said controller, a removable circuit-closing plug, and a key-controlled lock operable to lock the circuit-controlling means against action and provided with a member movable by the key to a position to prevent the insertion of the plug when the circuit-controlling means are locked against operation.

27. In a controller, circuit closers housed within the controller casing, circuit terminals other than those controlled by the circuit closers, said circuit terminals being suitably housed in the casing, a removable plug for the said circuit terminals, insertible through a suitable opening into the casing, and a lock for the circuit closers in the casing provided with a member movable across the opening for the plug to close said opening when the circuit closers are locked against operation.

28. In a controller, circuit closers housed in said controller, circuit terminals under the control of said circuit closers, other circuit terminals also housed in said controller, a plug insertible into and removable from said controller casing and adapted to complete the circuit between the said other circuit terminals, and a key-controlled lock for the circuit closers having means for preventing the insertion of the plug when the lock is operative to hold the circuit-closing means against operation, said means for preventing the insertion of the plug also operating to prevent movement of the lock to an extent sufficient for the removal of the key when the plug is inserted to close the circuit controlled thereby.

29. In a controller, series of contact segments, hubs carrying the same, a shaft carrying said hubs, means for coupling either of said hubs to the shaft, and means for yieldingly holding the hubs against rotation comprising a notched segment on each hub, a roller engaging the notches in the segment, and a yielding mounting in the roller permitting the segment to move by forcing the roller out from the notch engaged thereby.

30. In a controller, series of contact segments, hubs carrying the same, a shaft carrying said hubs, means for coupling either of said hubs to the shaft, and means for yieldingly holding the hubs against rotation comprising a notched segment on each hub, and a yielding insulated stop for engaging the notches in the notched segments.

31. In a controller, series of contact segments, hubs carrying the same, a shaft carrying said hubs, means for coupling either of said hubs to the shaft, and means for yieldingly holding the hubs against rotation comprising a notched segment on each hub, a yielding insulated stop for engaging the notches in the notched segments, comprising a roller, a support therefor terminating in a guide rod, an insulating socket receiving said rod, a spring housed in said socket and tending to force the rod outward, and a removable cup receiving the insulating socket and removably secured to the casing of the controller.

32. In a system of electric control for cars, means for coupling the driving power of the car to the axles thereof, other means for raising or lowering the rate of transmission of speed from the driving means to the car axles, electric means for controlling the coupling and speed changing mechanisms, and a controller having contact segments controlling the electric means for the coupling mechanism and the electric means for the speed-changing mechanism to maintain the electric side of the coupling mechanism constantly energized during the normal running of the car and for raising and lowering and maintaining the speed of transmission from the driving source to the car axles.

33. In a system of electric control for cars, means for coupling the driving power of the car to the car axles, means for changing the speed of rotation of the car axles irrespective of the speed of the prime mover, electric means for governing the operation of said means, electrically operated brake controlling mechanisms, a controller, circuit-controlling means carried by the controller for maintaining the car in operation, and means for automatically setting the controller to a position to cause an emergency application of the brakes when the controller in any of its positions for causing the running of the car is relieved from the active control of the operator.

34. In a system of electric car control, an electrically operated brake controlling system, electrically-operated means for causing the running of the car under the impulse of a suitable source of power, a controller, contact segments carried by the controller and movable under predetermined conditions to effect the running of the car and under other predetermined conditions to cause the operation of the brake controlling mechanism, and means for causing the emergency application of the brakes either under the volition of the operator or automatically without the volition of the operator when the controller under running conditions is no longer under the control of the operator.

In testimony that I claim the foregoing as my own, I have hereto affixed my signature in the presence of two witnesses.

WILLIAM C. MAYO.

Witnesses:
 WM. ADAMS,
 J. H. BUCHANAN.